US011651303B2

(12) United States Patent
Marquette

(10) Patent No.: US 11,651,303 B2
(45) Date of Patent: May 16, 2023

(54) METHOD FOR DOCUMENTING AT LEAST ONE WORK STEP, AND HAND-HELD TOOL

(71) Applicant: Würth International AG, Chur (CH)

(72) Inventor: Adrien Marquette, Schwäbisch Hall (DE)

(73) Assignee: WÜRTH INTERNATIONAL AG, Chur (CH)

( * ) Notice: Subject to any disclaimer, the term of this patent is extended or adjusted under 35 U.S.C. 154(b) by 299 days.

(21) Appl. No.: 16/856,530

(22) Filed: Apr. 23, 2020

(65) Prior Publication Data

US 2020/0338679 A1 Oct. 29, 2020

(51) Int. Cl.
*B23Q 17/24* (2006.01)
*G06F 16/51* (2019.01)
*G06F 16/535* (2019.01)
*G06V 10/22* (2022.01)
*G06V 10/25* (2022.01)
*G06V 10/147* (2022.01)
*G06Q 10/06* (2023.01)

(52) U.S. Cl.
CPC ......... *G06Q 10/06* (2013.01); *B23Q 17/2409* (2013.01); *G06F 16/51* (2019.01); *G06F 16/535* (2019.01)

(58) Field of Classification Search
CPC ... B23Q 17/2409; G06F 16/51; G06F 16/535; G06V 10/25; G06V 10/147; G06V 10/22
See application file for complete search history.

(56) References Cited

U.S. PATENT DOCUMENTS

| 7,032,299 | B2* | 4/2006 | Arase ................ H05K 13/0452 |
| | | | 356/419 |
| 9,896,810 | B2* | 2/2018 | Berning ........... H04N 5/232933 |
| 2015/0253766 | A1 | 9/2015 | Pettersson et al. |
| 2016/0046010 | A1 | 2/2016 | Busscharet et al. |
| 2016/0048122 | A1* | 2/2016 | Lukosz .................... B25F 5/00 |
| | | | 700/114 |
| 2017/0057040 | A1 | 3/2017 | Rzasa et al. |
| 2019/0063679 | A1 | 2/2019 | Mergener |
| 2020/0253444 | A1* | 8/2020 | Frank .................... A47L 9/2815 |

FOREIGN PATENT DOCUMENTS

DE 102009047044 5/2011

* cited by examiner

*Primary Examiner* — Angelica Ruiz
(74) *Attorney, Agent, or Firm* — Boyle Fredrickson S.C.

(57) ABSTRACT

The invention relates to a method for documenting at least one work step with a hand-held tool, wherein the hand-held tool has at least one camera mechanically connected to the tool, in which the steps of activating the camera and capturing images of the work step which is performed with the hand-held tool, and the generation of image data pertaining to the work step are provided.

15 Claims, 1 Drawing Sheet

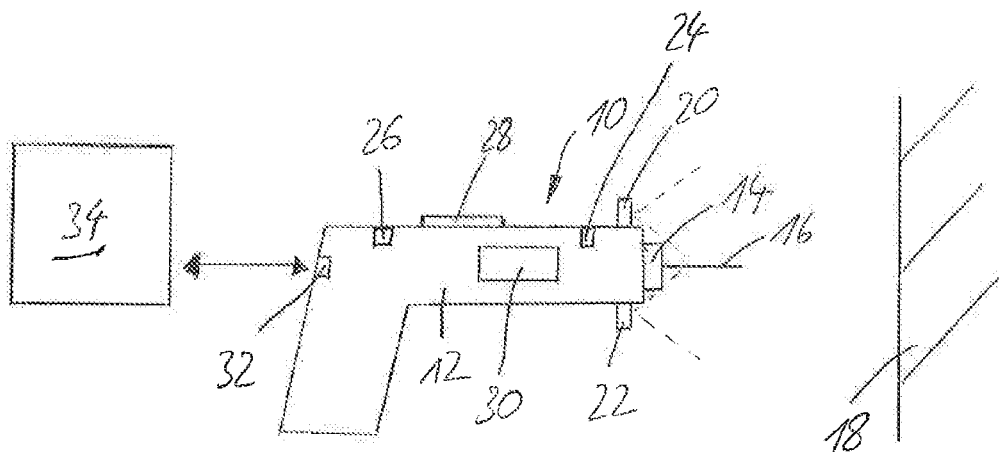
Fig. 1
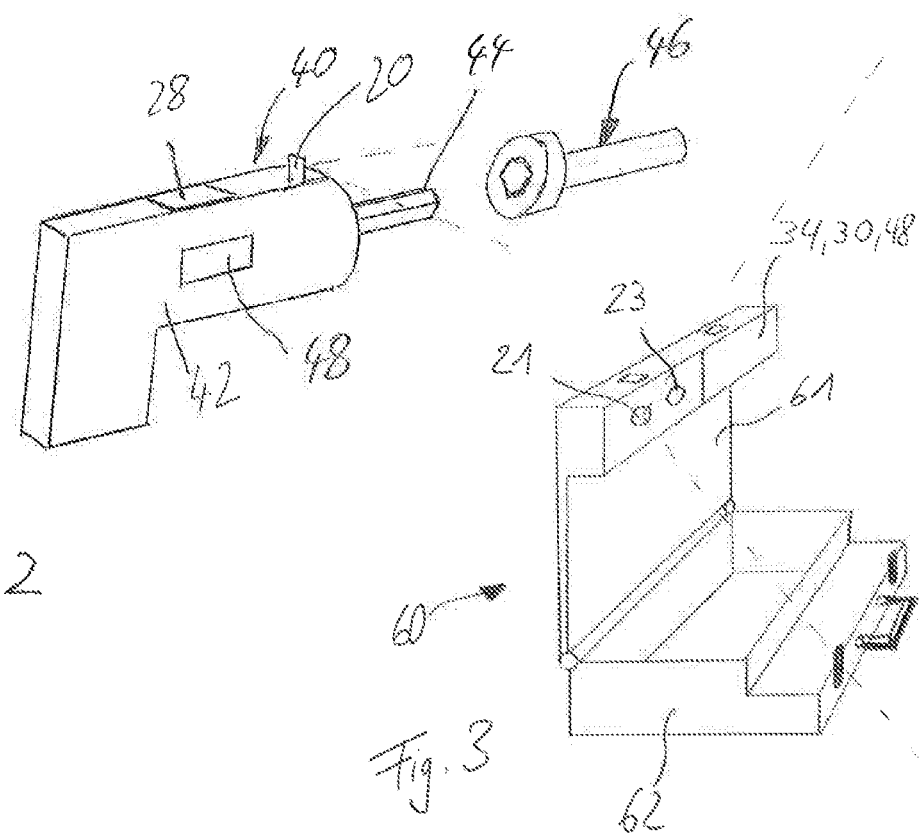
Fig. 2
Fig. 3

METHOD FOR DOCUMENTING AT LEAST ONE WORK STEP, AND HAND-HELD TOOL

FIELD OF THE APPLICATION

The invention relates to a method for documenting at least one work step with a hand-guided tool. The invention also relates to a hand-held tool.

BACKGROUND

The invention is intended to improve a method for documenting at least one work step with a hand-guided tool and a hand-guided tool.

SUMMARY

To this end, according to the invention a method for documenting at least one work step with a hand-guided tool is provided, wherein the hand-guided tool has at least one camera, in particular mechanically connected to the tool, in which the steps of activating the camera and recording images of the work step which is performed with the hand-guided tool and the generation of image data pertaining to the work step are provided.

As the hand-guided tool itself is fitted with at least one camera, it is easily possible to document a work step performed with the hand-guided tool. The camera or cameras on the hand-guided tool are aligned such that they have at least one object being or to be processed in the field of view, and ideally the cameras are aligned in such a way that they have both a tool insert of the hand-guided tool and the object being or to be processed in the field of view. By using the at least one camera, it is very simple to create documentation about the completed work step. A hand-guided tool is a hand-held, movable tool that is not connected to a machine base, with the exception of an electrical supply cable, where provided. Cordless hand-guided tools, such as those with rechargeable batteries, powered by internal combustion engine or flame, are also included within the scope of the invention. In particular, robot arms, even if they can be guided by hand, are not referred to as hand-held tools in the context of the invention. Hand-held tools are typically electric drills, electric grinders, electric saws, cordless screwdrivers, electric hot-air blowers and the like. Such hand-held tools are widely used to perform all kinds of work steps. If the performed work steps require documenting, this is usually very labour-intensive and therefore tends to be carried out incompletely, if at all. Providing at least one camera on the hand-held tool significantly facilitates the documentation of a work step. The recorded image data represents at least one part of the documentation and can be supplemented, if desired and required, with additional information, such as the date, time and the name or identification of the operator.

An extension of the invention provides that further parameters pertaining to the work step are recorded using at least one other sensor arranged in or on the hand tool, and sensor data pertaining to the work step is generated.

If desired or required, it is possible to supplement the documentation with additional data, which is then collected by additional sensors. These can be, for example, an ambient temperature, an ambient humidity, but also the rotational speed, size and torque of a tool insert used. For example, the type of tool insert can also be recorded. For example, by using image recognition it is possible to determine whether an angle grinder has a grinding wheel for dealing with stone or metal. Other data collected by sensors can be, for example, the temperature of a hot-air flow generated by the hand-held tool or a position of the hand-held tool or tool insert in space. If, for example, a drill hole has to be placed at a defined location, the position of the hand-held tool or tool insert can be recorded using a position sensor, corrected if necessary, and then documented.

In an extension of the invention, the generation of device data pertaining to the hand-held tool is provided.

Such device data can be the device type and/or a device number, for example, or the type and size of a tool insert used, for example, if applicable the operating hours worked with the hand-held tool during the work step, and the total number of operating hours of the hand-held tool, as well as a rotation rate and an operating state of the hand-held tool.

An extension of the invention provides for transferring the generated image data, sensor data and/or device data to a computer and at least temporarily storing the image data, sensor data and/or device data in the computer.

An extension of the invention provides for creating documentation of the at least one work step using the image data, sensor data and/or device data transferred to the computer.

It is thereby possible to create a documentation after the work step has been completed, for example at the end of a working day. When creating documentation, additional data can be added manually or by means of appropriate devices, or else data, such as unnecessary image data, can be deleted for example. The documentation created in this way can then be read via an interface of the hand-held device and stored in a suitable location. The interface can be wired or wireless. For example, the documentation created can be loaded into a building information management (BIM) system. It is also provided in the context of the invention that the hand-held tool will also receive information from the building information management system via the interface, such as for example the positions for holes, type and parameters to be used for performing a work step, such as for example a grinding wheel to be used, a glue to be used or the like.

In an extension of the invention the camera is activated by moving the hand-held tool, switching on the hand-held tool and/or unfolding the camera out of a housing of the tool.

For example, the camera can be activated automatically by picking up and moving the hand-held tool. It is also advantageous to activate the camera by switching on the hand-held tool, for example by switching on an electric hand-held drill. The camera can also be activated by simply folding the camera out of a housing or simply turning on the camera. This is particularly advantageous if, for example, after performing a part of a work step with the hand-held tool, for example sanding a surface, a subsequent, purely manual processing is to be carried out, for example the regrinding or painting of the processed surface, and if these subsequent work steps are also to be documented.

An extension of the invention provides for recording further parameters pertaining to the work step, wherein the recording of a date, a time, a material of an object processed with the tool, a type and size of a tool insert used, a rotational position of a tool insert relative to the tool, a drill hole depth or screw-in depth, a rotational speed of a tool insert used with the tool, a torque of a tool insert used with the tool, a position of the tool and of the tool insert in space, a temperature of the tool, an environment and/or a processed object, a humidity of the environment and/or a processed object and/or identification data of an operator of the tool is provided.

For example, before or when drilling a hole, it can be detected whether the building wall is made of wood or stone and whether a wood drill or a stone drill should be used to drill the hole. When screwing in screws, it can be determined whether the screwdriver bit matches the screw and the rotation speed and torque with which the screw should be screwed in. For example, a rotational position of the pre-mounted screw can also be detected and a rotational position of the screwdriver bit can then be automatically set to the correct position, so that the screwdriver bit can directly engage with the screw drive formation without further rotation. A position sensor can be used to detect a position of the tool and the tool insert in space. For example, it can be detected whether a drill hole is placed in the correct location as specified in the building information management system. For example, it is also possible to detect a humidity of the environment and/or of an object being processed or to be processed, as well as a temperature of the tool, an environment and/or an object being processed or to be processed. For example, when applying adhesive, it can be detected whether the surface to be coated with the adhesive is at the correct temperature and humidity. When using a hot-air blower or soldering tool, it can be determined whether the correct temperature of the processed object and the tool, the hot-air flow generated by the tool, or the flame generated by the tool is present. Finally, identification data of an operator, specifically the name or an identification number of the operator, can be recorded. Of course, in addition to a time and date, a duration of the work step can also be recorded.

Parameters or data pertaining to the work step can be acquired by means of a rotation speed sensor arranged in the tool, a torque sensor arranged in the tool, a rotational position sensor arranged in the tool, a position sensor arranged on the tool, a distance sensor arranged on the tool, an optical sensor arranged on the tool, an ultrasonic sensor arranged on the tool, a high-frequency sensor arranged on the tool, a temperature sensor arranged in or on the tool and/or a humidity sensor arranged in or on the tool.

In an extension of the invention the computer is arranged in the tool and the target data relating to a work step to be carried out with the tool is transferred to the computer.

For example, a building information management system transfers the target positions for designated drill holes to the computer in the tool. Due to a position sensor in the tool, the tool can determine whether it or the tool insert is positioned at the specified target position or not. For example, the building information management system can also transfer information about the location of electrical cables, so that the hand-held tool, such as for example an electric hand-held drill, automatically issues a warning message when an attempt is made to drill a hole in the area of electrical cables. To this end, the hand-held tool can have a display device to display warning messages or other messages. Target data transferred to the computer in the hand-held tool can also be, for example, torques for screws to be screwed in, or the like. The hand-held tool can also be controlled according to the target data.

In an extension of the invention the target data are compared with the acquired image data, sensor data and/or device data pertaining to the work step.

If, for example, a target torque is specified for screwing in a screw, the actual torque with which the screw was actually screwed in is stored and compared with the target torque. If the actual values deviate from the target values, a warning message can be issued. For example, target positions can also be compared with actual positions, such as for example target positions and actual positions of drill holes.

In an extension of the invention a warning message or warning signal is generated if a comparison of the target data with the acquired image data, sensor data and/or device data reveals a deviation outside of a predefined range, and the hand-held tool is controlled with the target data if necessary.

In an extension of the invention the target data is displayed by means of a display device on the tool.

For example, a manual electric drill is moved to a target position of a drill hole. As soon as the target position is reached, a corresponding confirmation signal is issued on the display device. In addition, the target hole depth and the target hole size can then also be displayed.

An extension of the invention provides automatically limiting a maximum rotation speed and/or a maximum torque of the tool depending on the target data.

The problem addressed by the invention is also solved by a hand-held tool for carrying out a method according to the invention, wherein the hand-held tool has at least one camera, in particular mechanically connected to the tool.

The provision of a camera mechanically connected to the hand-held tool allows the work steps performed with the hand-held tool to be documented in a surprisingly simple manner.

An extension of the invention involves the hand-held tool being fitted with sensors for recording parameters pertaining to a work step.

Further features and advantages of the invention are obtained from the claims and the following description of preferred embodiments of the invention in connection with the drawings. Individual features of the different embodiments depicted and described can be combined in any way without exceeding the scope of the invention. This also applies to the combination of individual features without further individual features in connection with which they are described.

BRIEF DESCRIPTION OF THE DRAWINGS

In the drawings:

FIG. 1 shows a schematic representation of a hand-held tool according to the invention in accordance with a first embodiment, FIG. 2 shows a schematic representation of a hand-held tool according to the invention in accordance with a second embodiment and FIG. 3 shows a schematic representation of a case for a hand-held tool according to the invention in accordance with the first or second embodiment.

DETAILED DESCRIPTION

FIG. 1 shows a hand-held tool 10 in accordance with a first embodiment of the invention. The hand-guided tool is designed as an electric drill. The hand-held tool is fitted with a housing 12, a drill chuck 14 and a tool insert 16. The tool insert 16 is implemented as a spiral drill in the embodiment shown. The tool insert is to be used to drill a hole in a building wall 18.

The housing 12 is fitted with two fold-out cameras 20, 22. The first camera 20 is arranged on the top of the housing 12 and its field of view is aligned so as to include both the tool insert 16 and an area in front of the tool insert 16, in which the building wall 18 is located in FIG. 1. The second camera 22 is arranged opposite the first camera 20 on an underside of the housing and with its field of view also aligned so as to capture the tool insert 16 and an area in front of the tool insert 16, in which the building wall 18 is located in FIG. 1.

The scope of the invention can include the provision of only one camera or more than two cameras. Two cameras 20, 22 can be used to capture a spatial image of the tool insert 16 and the area in front of the tool insert 16. This greatly improves the documentation of a work step to be created using the cameras 20, 22. A further sensor 24, designed as a torque sensor and/or distance sensor, for example, is provided in the housing 12. A torque applied to the tool insert 16 and/or a distance of the housing 12 from the building wall 18 can be detected using the torque sensor 24.

Also arranged in the housing 12 is a position sensor 26, such as a GPS sensor or a navigation system sensor, which can be used to determine the position of the hand-held tool 10 in a building.

A display device 28, known as a display, is also provided on the top of the housing 12. In the housing of the hand-held tool 12 a computer 30 is arranged, which is connected to the two cameras 20, 22, the torque sensor 24, the position sensor 26 and also the display device 28. The image data from the two cameras 20, 22, and the sensor data from the sensors 24, 26 are transferred to the computer 30, which can then process them in a suitable form, with additional data if necessary, for the documentation of a completed work step. Information can be output via the display device 28, but other data can also be input via the display device 28, for example the name or an identifier of an operator and the like. For example, the display unit 28 can also be used to enter the start and end of a work step in order to activate and deactivate the cameras 20, 22.

Before the start of a work step, the two cameras 20, 22 can also be activated by simply unfolding them. The cameras 20, 22 then continuously capture image data, for example, while a hole is drilled in the building wall 18 using the spiral drill, i.e. the tool insert 16. The two cameras 20, 22 or a distance sensor can also be used to determine how deep the drill hole is being drilled and also to determine the diameter of the spiral drill being used and the diameter of the resulting drill hole. Once the drill hole has been drilled, the two cameras 20, 22 can either be switched off or the cameras 20, 22 can remain in operation, for example during the manual insertion of a wall plug into the drill hole.

After completing the work step, an associated documentation can be created, as described, on the computer 30.

The documentation can then be output via an interface 32 on the housing 42. The interface 32 can be designed as a simple connector or as a wireless interface. The documentation is then transferred to a higher-level memory or computer 34, for example to a building information management system.

In the reverse direction, data can also be transferred from the computer or memory 34 to the hand-held tool 10 using the interface 32. This data can be, for example, target data for the work steps to be performed. Target data can be, for example, the position in space of a hole to be drilled, the depth and the diameter of a hole to be drilled, and, if necessary, a tightening torque for a screw to be screwed into the drill hole. Such target data can be displayed on the display device 28. For example, in the computer 30, a comparison can also be made between the target data and the actual data recorded during the performance of the work step, and the comparison result can be entered into the documentation and/or displayed on the display device 28.

The illustration in FIG. 2 shows a hand-held tool 40 according to another embodiment of the invention. The hand-held tool 40 is designed as a cordless screwdriver and only has one camera 20 on the housing 42. The camera 20 is arranged such that its field of view includes an area in front of the hand-held tool and a screwdriver bit 44 inserted into the drill chuck of the cordless screwdriver. In the area in front of the cordless screwdriver and thus in the field of view of the camera 20, a screw 46 is shown as an example. The screw 46 has a drive formation in the form of a hexagonal recess and the screwdriver bit 44 has a hexagonal head. Using the camera 20, a rotation position of the hexagonal recess can now be recorded at the screw 46 and after evaluating the image data from the camera 20 in the computer 48 in the housing 42, the screwdriver bit 44 can be rotated such that the screwdriver bit 44 can be inserted into the hexagonal recess of the screw 46. In order to insert the screwdriver bit 44 into the drive formation of the screw 46, it is thus not necessary to turn the housing 42 or the screwdriver bit 44 back and forth, as was previously the case. The screwdriver bit 44 is already correctly aligned and an operator can immediately start the screwing or unscrewing process. A rotation position of the screwdriver bit 44 can be continuously monitored and corrected, for example during the whole process of approaching the drive formation on the head of the screw 46 with the screwdriver bit 44.

The housing 42, like the housing 12 of the hand-held tool 10 in FIG. 1, is fitted with a display device 28. The display device 28 can be used to display, for example, target rotation speeds or target torques for screwing in the screw 46, and an actual torque or actual speed can also be displayed, for example. When screwing in, the rotation speed and torque are controlled according to the target data from the computer 30, 48 or memory or computer 34, so that the screw is screwed in according to the target data.

The camera 20, 22 can be mechanically connected to the hand-held tool 10, 40, wherein the work steps performed with this hand-held tool 10, 40 are then recorded with the camera 20, 22.

FIG. 3 shows a case 60 with a hinged or removable lid 61 and a main case body 62 for a hand-held tool 10, 40, as shown in FIG. 1 or FIG. 2, or another hand-held tool, not shown, without a camera. At least one other camera 21, 23 can be provided on the case 60, separately and detached from the hand-held tool 10, 40. In the context of the invention, the camera 21, 23 can also be arranged elsewhere on the case 60 or can be designed as a portable camera independent of the case. The camera 21, 23 is arranged on the lid 61 of the case 60 and is positioned so that it can record the work steps performed with the hand-held tool 10, 40 or with the hand-held tool without a camera, not shown. For this purpose, the case 60 must be positioned at a location where the work steps are carried out with the hand-held tool 10, 40 or with the hand-held tool without a camera, not shown. The computer 30, 48 and/or memory or computer 34 is/are arranged next to the camera 21, 23 in the lid 61, but can also be arranged at another location in or on the case 60. In the context of the invention, the computer 30, 48 and/or the memory or computer 34 and the camera 21, 23 or a plurality of cameras 21, 23 can also be arranged independently of a tool case and positioned appropriately.

Between the hand-held tool 10, 40 or the hand-held tool without a camera, not shown, and the computer 30, 48 and/or memory or computer 34, a communication connection is provided, in particular designed wirelessly. The camera 21, 23 is activated when operating the hand-held tool 10, 40 or the hand-held tool without a camera, in order to record the operations to be carried out. In addition, the hand-held tool 10, 40 or the hand-held tool without a camera, not shown, is coupled to the computer 30, 48 or the memory or computer 34 to the effect that it displays the target rotation speeds or the target torques for screwing in the screw 46, for example, on the display device 28. When screwing in, the rotation speed and torque are controlled according to the target data from the computer 30, 48 or memory or computer 34, so that the screw is screwed in according to the target data.

Depending on the situation, the camera 20, 22 and/or camera 21, 23 can then record the work steps.

The invention claimed is:

1. Method for documenting at least one work step with a hand-guided tool, wherein the hand-held tool has at least one camera, in particular mechanically connected to the tool, comprising the steps:
receiving information from a building information system in defining a work step to be performed based on information specific to the building stored in the building information system;
activating the camera and capturing images of the work step performed with the hand-held tool and generating image data associated with the work step;
recording further parameters pertaining to the work step using at least one other sensor arranged in or on the hand-held tool and generating sensor data pertaining to the work step;
generating device data pertaining to the hand-held tool;
transferring the generated image data, sensor data and/or device data to a computer and at least temporarily storing the image data, sensor data and/or device data in the computer; and
creating documentation of the at least one work step using the image data, sensor data and/or device data stored on the computer.

2. Method according to claim 1, comprising activating the camera by moving the hand-held tool, switching on the hand-held tool and/or unfolding the camera out of a housing of the tool.

3. Method according to claim 1, wherein provision is made for recording further parameters pertaining to the work step, wherein the recording of a date, a time, a material of an object processed with the tool, a type and size of a tool insert used, a rotational position of a tool insert relative to the tool, a drill hole depth or screw-in depth, a rotational speed of a tool insert used with the tool, a torque of a tool insert used with the tool, a position of the tool and the tool insert in space, a temperature of the tool, a temperature of an environment and/or a temperature of a processed object, a humidity of the environment and/or a humidity of a processed object and/or identification data of an operator of the tool is provided.

4. Method according to claim 3, comprising acquisition of data by means of a rotation speed sensor arranged in the tool, a torque sensor arranged in the tool, a rotation position sensor arranged in the tool, a position sensor arranged on the tool, a distance sensor arranged on the tool, an optical sensor arranged on the tool, an ultrasonic sensor arranged on the tool, a high-frequency sensor arranged on the tool, a temperature sensor arranged in or on the tool and/or a humidity sensor arranged in or on the tool.

5. Method according to claim 1, wherein the computer is arranged in the tool, characterized by and further including transferring target data relating to a work step to be carried out with the tool to the computer.

6. Method according to claim 5, comprising comparing the target data with the acquired image data, sensor data and/or device data belonging to the work step.

7. Method according to claim 6, comprising generating a warning message or warning signal if a comparison of the target data with the acquired image data, sensor data and/or device data reveals a deviation outside a predefined range, and controlling the hand-held tool with the target data if necessary.

8. Method according to claim 5, comprising displaying the target data by means of a display device on the tool.

9. Method according to claim 5, comprising automatically limiting a maximum rotation speed and/or a maximum torque of the tool depending on the target data.

10. Hand-guided tool for carrying out a method according to claim 1, wherein the hand-held tool has at least one camera, in particular mechanically connected to the tool.

11. Hand-guided tool according to claim 10, wherein the hand-held tool is fitted with sensors for recording parameters pertaining to a work step.

12. Hand-guided tool according to claim 10, wherein the hand-guided tool comprises a computer arranged in or on a housing of the hand-guided tool, wherein at least one of generated image data, sensor data and device data are transferred to the computer and at least temporarily stored in the computer.

13. Hand-guided tool according to claim 12, wherein target data relating to a work step to be carried out are at least temporarily stored in the computer.

14. Hand-guided tool according to claim 12, further including storing the documentation of the at least one work step in the building information system in association with the information from the building information system used in defining the work step.

15. Method for documenting at least one work step with a hand-guided tool, wherein the hand-held tool has at least one camera, in particular mechanically connected to the tool, comprising the steps:
receiving information from a building information system that defines a work step to be performed based on information specific to the building stored in the building information system;
activating the camera and capturing images of the work step performed with the hand-held tool and generating image data associated with the work step;
recording further parameters pertaining to the work step using at least one other sensor arranged in or on the hand-held tool and generating sensor data pertaining to the work step;
generating device data pertaining to the hand-held tool;
transferring the generated image data, sensor data and/or device data to a computer and at least temporarily storing the image data, sensor data and/or device data in the computer; and
creating documentation of the at least one work step using the image data, sensor data and/or device data stored on the computer.

* * * * *

UNITED STATES PATENT AND TRADEMARK OFFICE
CERTIFICATE OF CORRECTION

PATENT NO. : 11,651,303 B2
APPLICATION NO. : 16/856530
DATED : May 16, 2023
INVENTOR(S) : Adrien Marquette Page 1 of 1

It is certified that error appears in the above-identified patent and that said Letters Patent is hereby corrected as shown below:

On the Title Page

Related Foreign Application Priority Data should read as follows:
Apr. 24, 2019 (EP) 19170858

Signed and Sealed this
Twenty-second Day of October, 2024

Katherine Kelly Vidal
*Director of the United States Patent and Trademark Office*